United States Patent
Chu et al.

(10) Patent No.: US 12,339,790 B2
(45) Date of Patent: Jun. 24, 2025

(54) DYNAMIC INPUT/OUTPUT SUPPORT FOR PORTABLE INFORMATION HANDLING SYSTEMS

(71) Applicant: DELL PRODUCTS L.P., Round Rock, TX (US)

(72) Inventors: Tao-Peng Chu, Zhongshan (TW); Chen-Hsin Chang, Keelung (TW); Shao-Hung Yu, New Taipei (TW); Yi-Chung Chu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 18/165,816

(22) Filed: Feb. 7, 2023

(65) Prior Publication Data

US 2024/0264953 A1 Aug. 8, 2024

(51) Int. Cl.
*G06F 13/10* (2006.01)
*G06F 1/16* (2006.01)

(52) U.S. Cl.
CPC ............ *G06F 13/10* (2013.01); *G06F 1/1618* (2013.01); *G06F 2213/40* (2013.01)

(58) Field of Classification Search
CPC ..... G06F 1/1618; G06F 13/10; G06F 2213/40
See application file for complete search history.

(56) References Cited

U.S. PATENT DOCUMENTS

| | | | |
|---|---|---|---|
| 10,254,802 B1 | 4/2019 | Chang et al. | |
| 2009/0158074 A1* | 6/2009 | Oh | G06F 9/5094 713/340 |
| 2009/0278828 A1* | 11/2009 | Fletcher | G09G 3/3406 455/566 |
| 2013/0106353 A1* | 5/2013 | Foster | H01M 50/256 320/114 |
| 2014/0300581 A1 | 10/2014 | Aurongzeb et al. | |
| 2014/0362507 A1* | 12/2014 | Kinoshita | G06F 1/1681 16/374 |
| 2018/0340768 A1* | 11/2018 | Zancanato | G06F 1/1677 |
| 2019/0036563 A1 | 1/2019 | Koshy et al. | |
| 2021/0041913 A1* | 2/2021 | Lu | G06F 1/1662 |
| 2021/0059401 A1* | 3/2021 | Perelli | A47B 97/04 |
| 2021/0232526 A1 | 7/2021 | Sultenfuss et al. | |
| 2021/0311527 A1* | 10/2021 | Sumikawa | G06F 1/3212 |
| 2022/0317729 A1* | 10/2022 | Caplow-Munro | G06F 1/1677 |
| 2023/0101640 A1* | 3/2023 | Doctor | G06F 1/3275 |

* cited by examiner

*Primary Examiner* — Eric T Oberly
(74) *Attorney, Agent, or Firm* — Larson Newman, LLP

(57) ABSTRACT

An information handling system detects whether the system is in a 360-degree orientation, and detects whether the system is in the desktop mode. In response to determining that the system is in the 360-degree orientation, that the system is in the desktop mode, and that an external display device is connected, the system enables an input/output device and disables a display device.

20 Claims, 9 Drawing Sheets

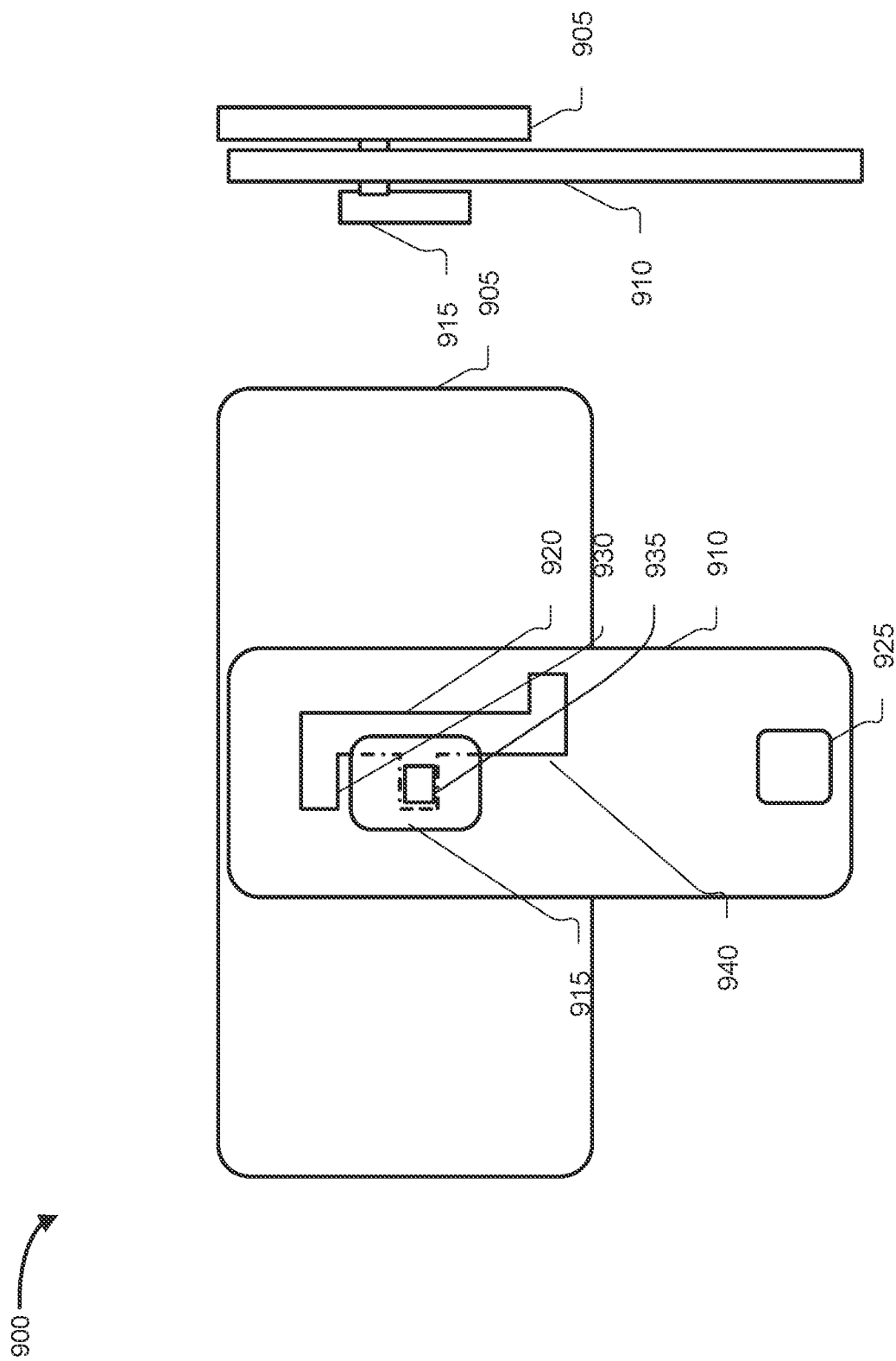

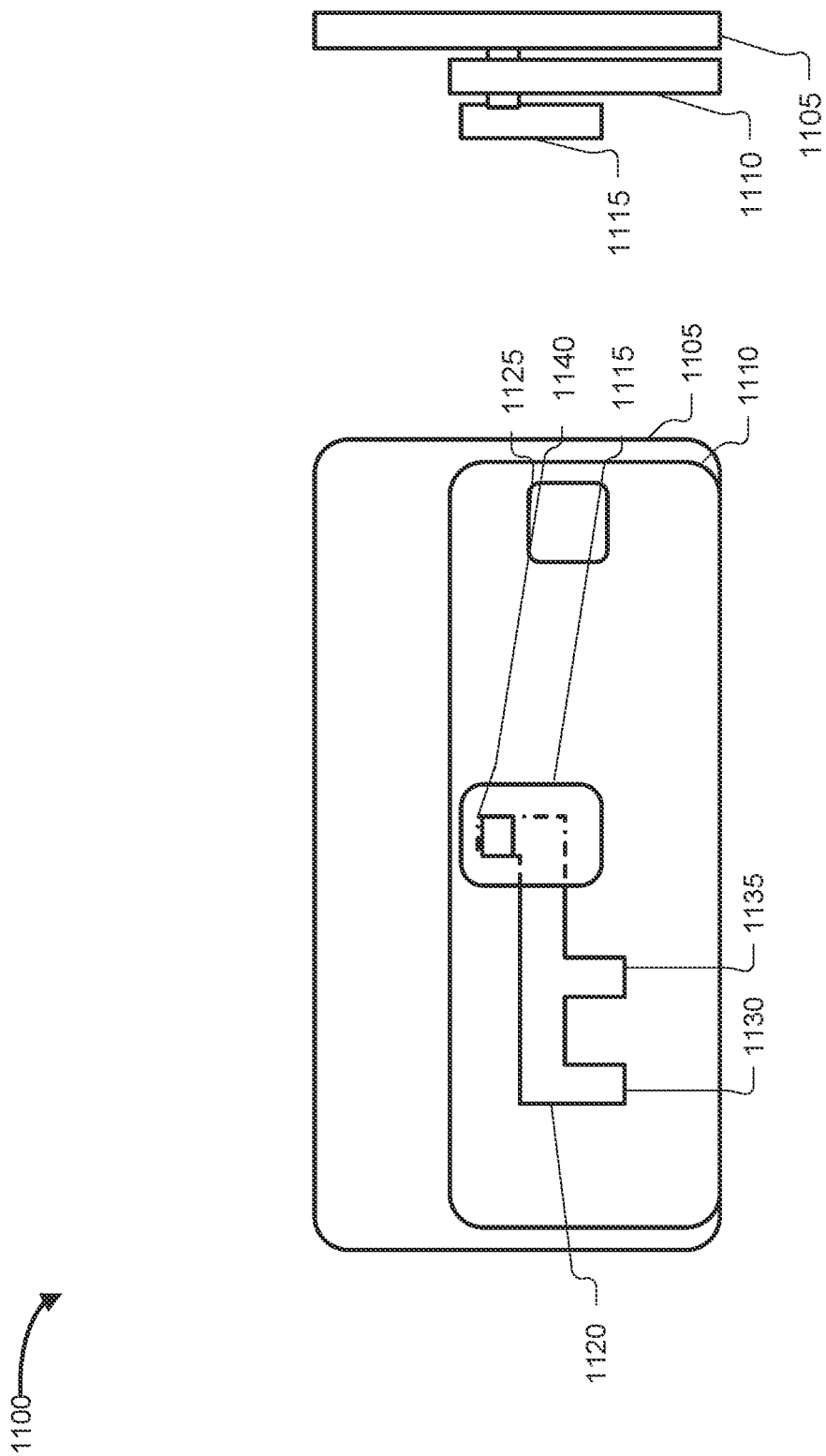

DYNAMIC INPUT/OUTPUT SUPPORT FOR PORTABLE INFORMATION HANDLING SYSTEMS

FIELD OF THE DISCLOSURE

The present disclosure generally relates to information handling systems, and more particularly relates to dynamic input/output support for portable information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system detects whether the system is in a 360-degree orientation, and detects whether the system is in the desktop mode. In response to determining that the system is in the 360-degree orientation, that the system is in the desktop mode, and that an external display device is connected, the system enables an input/output device and disables a display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 9 is a diagram illustrating a stand assembly of an information handling system configured for dynamic input/output support, according to an embodiment of the present disclosure;

FIG. 10 is a side view of a stand assembly of an information handling system configured for dynamic input/output support, according to an embodiment of the present disclosure;

FIG. 11 is a diagram illustrating a stand assembly of an information handling system configured for dynamic input/output support, according to an embodiment of the present disclosure;

FIG. 12 is a side view of a stand assembly of an information handling system configured for dynamic input/output support, according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
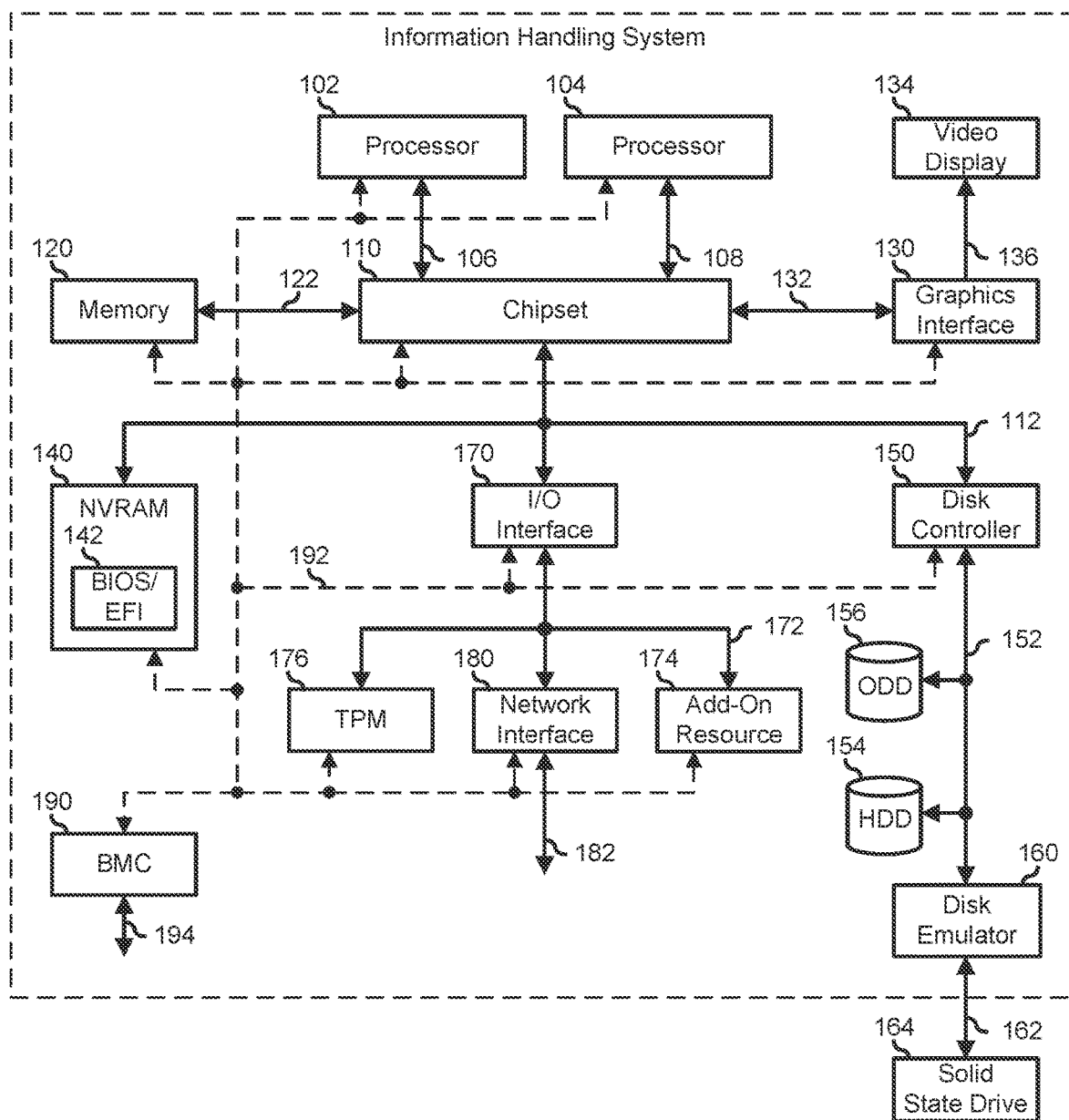
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth© or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a USB or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Portable information handling systems, such as laptop computers, tablet computers, notebook computers, 2-in-1 computers, or similar, may generally be any device that a user may carry for handheld use and that includes a processor. Portable information handling systems typically include a keyboard that may transition between various orientations, such as laptop mode, easel mode, tablet mode, etc. as the portable information handling system is adjusted between various positions. For example a user may set up a home office, wherein the user typically closes the lid of the laptop, such as in a clamshell mode, and connects the laptop to an external display device monitor. In this scenario, input/output components of the laptop, such as the keyboard and touchpad are locked and disabled. Thus, the user generally uses peripheral input/output devices cluttering the home office. Accordingly, having the ability to use the laptop's input/output devices allows the user to forego those peripheral devices resulting in a less cluttered workstation and also saving the user money. The present disclosure provides dynamic input/output support for convertible information handling systems allowing users to access the laptops' keyboard, touchpad, etc. while in 360-degree orientation, which is similar to a tablet orientation.

Figure 2:
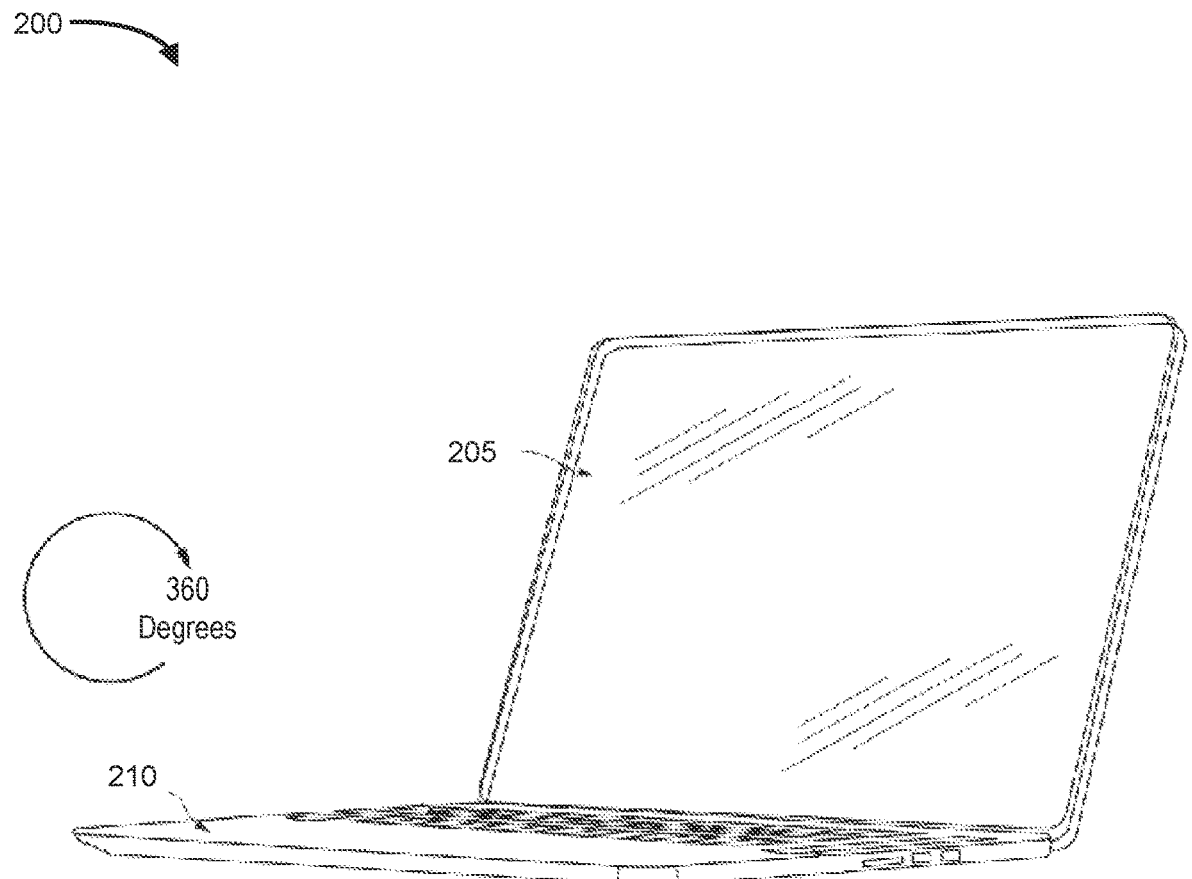
FIG. 2 is a perspective view illustrating a portable information handling system configured for dynamic input/output support, according to an embodiment of the present disclosure.

FIG. 2 shows a portable information handling system 200 configured for dynamic input/output support. Information handling system 200, which may be similar to information handling system 100 of FIG. 1, includes a display assembly 205 and a base assembly 210. In one embodiment, information handling system 200 may have a convertible form factor, also referred to as a 2-in-1 portable computer. The convertible form factor allows information handling system 200 to be folded or flipped into a variety of orientation or modes.

Display assembly 205 includes various components such as a display panel and a camera. Base assembly 210 also includes various components such as a keyboard, a touchpad, speakers, a top cover, and a bottom cover. Display assembly 205 is coupled to base assembly 210 via one or more hinges that support various configurations in interacting with a user. In one embodiment, information handling system 200 may be configured to be used in a 360-degree orientation by flipping, rotating, folding, or sliding display assembly 205 on its hinges, wherein display assembly 205 may be behind base assembly 210. When in the 360-degree orientation, display assembly 205 is folded underneath base assembly 210, wherein display assembly 205 lies substantially parallel to base assembly 210 such that display assembly 205 are in contact or nearly in contact with base assembly 210.

Figure 3:
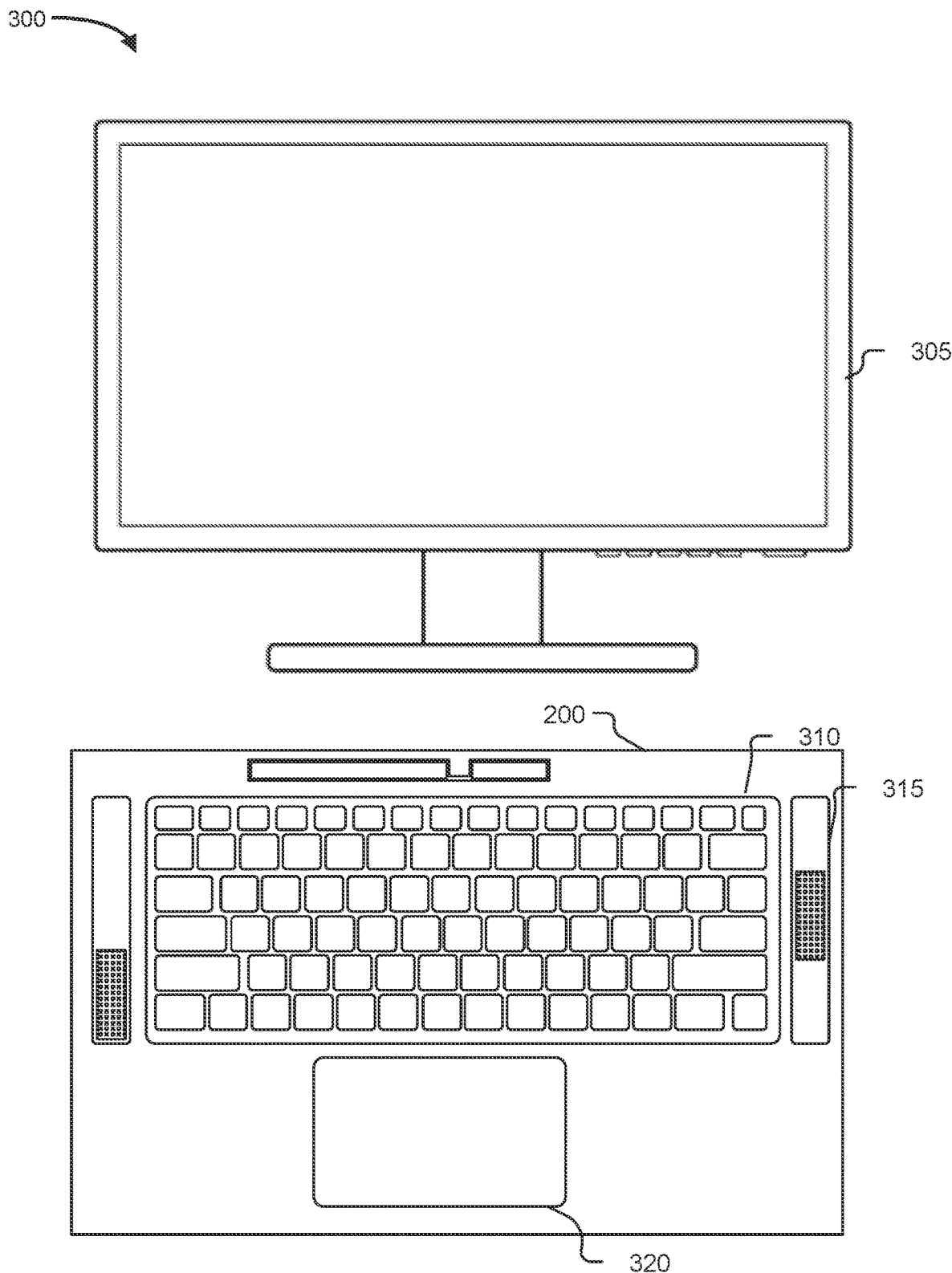
FIG. 3 is a diagram illustrating an information handling system workplace with dynamic input/output support, according to an embodiment of the present disclosure.

FIG. 3 shows an information handling system workplace 300. Information handling system workplace 300 includes a display monitor 305 and information handling system 200 in a 360-degree orientation. Information handling system 200 includes a keyboard 310, a speaker 315, and a touchpad 320. In this scenario, a user utilizes information handling system 200 as a desktop with full usage of keyboard 310, speaker 315, and touchpad 320.

Figure 4:
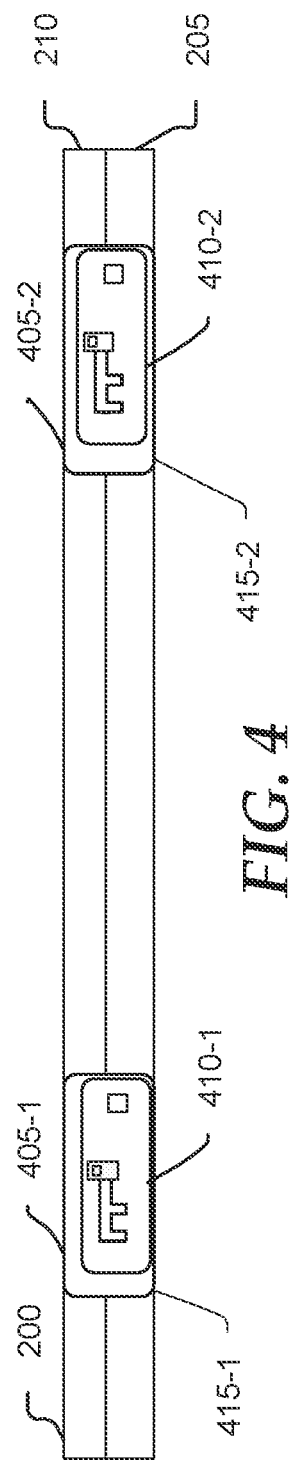
FIG. 4 is a back view of an information handling system configured for dynamic input/output support, according to an embodiment of the present disclosure.

FIG. 4 shows a back view of information handling system 200 in a 360-degree orientation. Information handling system 200 includes stand assemblies 405-1 and 405-2 (collectively referred to as stand assemblies 405 and individually as stand assembly 405). Stand assemblies 405 may be used to rotationally couple display assembly 205 and base assembly 210. Stand assemblies 405 includes bases 415-1 and 415-2 (collectively referred to as bases 415 and individually as a base 415) that may also be hinges that allow information handling system 200 to be in the 360-degree orientation. Bases 415 may be disposed between the display assembly and the base assembly of information handling system 200.

Stand assemblies 405 also includes stands 410-1 and 410-2 (collectively referred to as stand 410 and individually as a stand 410) respectively to support information handling system 200 in a stable position such that a display screen of display assembly 205 does not touch a surface 510 reducing the chance for contaminants that may scratch the display screen. In particular, stands 410, also referred to herein as feet, may be mechanical stands that can be retracted by the user when no longer needed or desired as shown herein. For example, the stands can be retracted when using the information handling system in laptop mode. In this embodiment, stand assemblies may be in an inactive mode. Although, it is shown that information handling system 200 includes two stand assemblies, information handling system 200 can include one or more than two stand assemblies. However, when needed or desired, stands 410 can be extended into variable heights as shown in FIG. 5 and FIG. 6.

Figure 5:
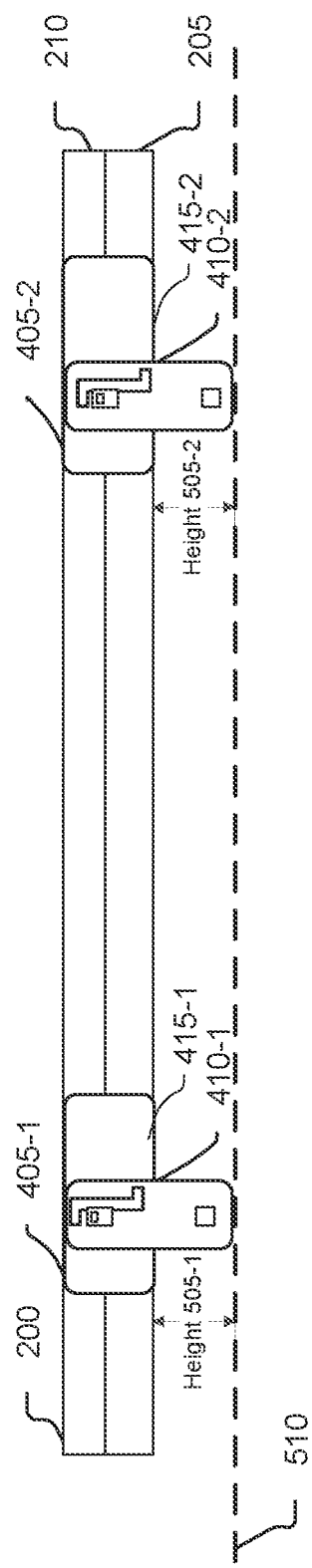
FIG. 5 is a back view of an information handling system configured for dynamic input/output support, according to an embodiment of the present disclosure.

FIG. 5 shows a back view of information handling system 200 in a 360-degree orientation. In this example, stands 410 are in middle height positions, such as at heights 505-1 and 505-2 (collectively referred to as heights 505 and individually as a height 505) respectively. In this example, each of stands 410 may have been rotated, in relation to its base. The base allows the stand to be rotated and extended by gliding along the slide rail. In this example, each of stands 410 is in a middle height position, which is perpendicular to information handling system 200. As such, height 505-1 is a height from surface 510 to the surface of display assembly 205. Height 505-2 is a height from surface 510 to the surface of display assembly 205. Accordingly, height 505-1 is similar to height 505-2. Surface 510 may be a top surface of a desk, table, or similar wherein the user may place information handling system 200. Retracting and extending stand 410 may act as a trigger mechanism that puts the stand assembly in active mode.

Figure 6:
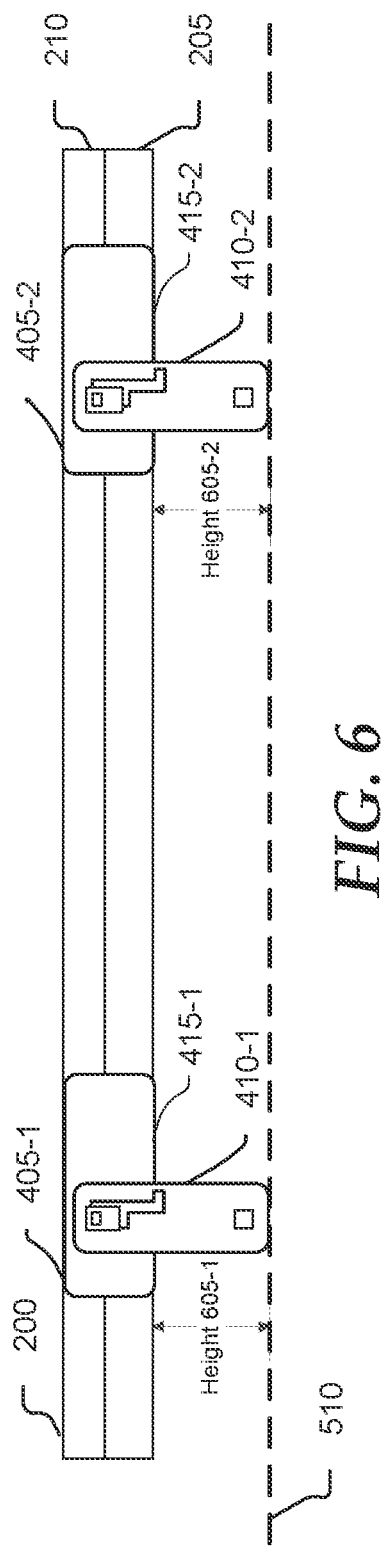
FIG. 6 is a back view of an information handling system configured for dynamic input/output support, according to an embodiment of the present disclosure.

FIG. 6 shows a back portion of information handling system 200, wherein stands 410-1 and 410-2 are in full height positions, such as at heights 605-1 and 605-2 (collectively referred to as heights 605 and individually as a height 605) respectively. Height 605-1 is a height from surface 510 to the surface of display assembly 205. Height 605-2 is a height from surface 510 to the surface of display assembly 205. Accordingly, height 605-1 is similar to height 605-2. As depicted herein, height 505 is a fraction of height 605.

Figures 7, 8:
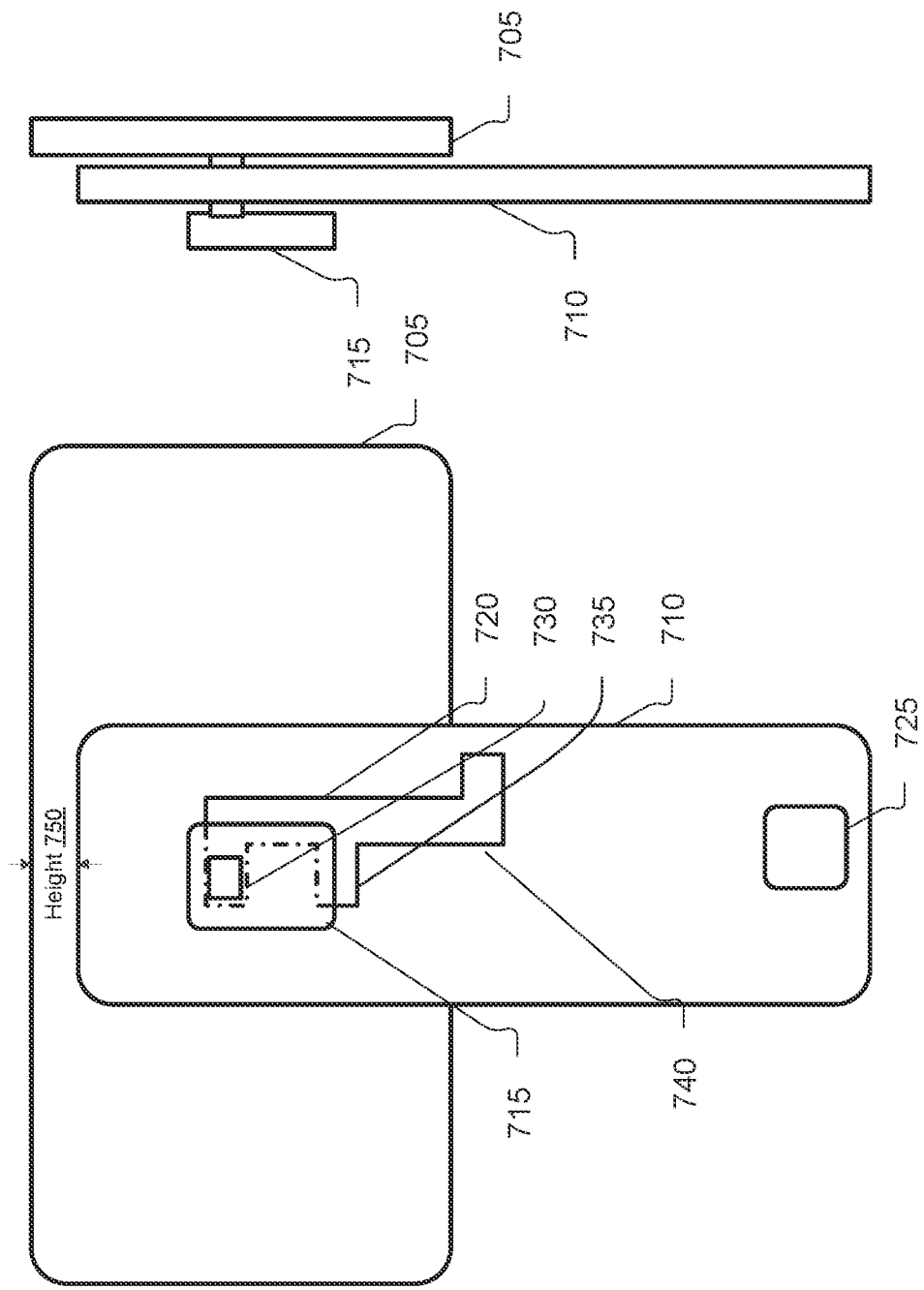
FIG. 7 is a diagram illustrating a stand assembly of an information handling system configured for dynamic input/output support, according to an embodiment of the present disclosure.
FIG. 8 is a side view of a stand assembly of an information handling system configured for dynamic input/output support, according to an embodiment of the present disclosure.

FIG. 7 shows a stand assembly 700 which is similar to stand assemblies 405 of FIG. 4. Stand assembly 700 includes a base 705, a stand 710, and a hook 715, which may be disposed around the center are of base 705. Stand 710 includes a slide rail 720 and a magnet 725. Slide rail 720 includes at least one channel, also referred to as a slot. In this example, slide rail 720 includes channels 730, 735, and 740 that are formed and extend horizontally along slide rail 720. Channel 730 is at the top portion of slide rail 720, while channel 734 is towards the middle portion of slide rail 720 and channel 740 is around the end. Channels 730 and 735 may be formed on one side of slide rail 720 while channel 740 may be formed on the opposite side. Slide rail 720 may be used to guide hook 715 between variable positions along slide rail 720 into a desired position. Although it is shown that slide rail 720 includes three channels, slide rail 720 can include more or less than the channels shown without limiting the present disclosure. Thus, the stand can be extended to variable heights than depicted in FIG. 5 and FIG. 6.

Hook 715 may be configured such that it can slide along slide rail 720 and secured in one of channels 730, 735, and 740. Each channel may be configured to receive hook 715, such that stand 710 may be of different positions based on the channel that hook 715 is slid into. In this example, hook 715 is inserted in channel 730, wherein stand 710 is at a full height position, wherein stand assembly 1100 is in active mode. Further, the top portion of stand 710 may be at a height 750 from the top of base 705.

FIG. 8 shows a side view of stand assembly 700. As depicted, stand 710 is disposed between hook 715 and base 705. Base 705 may be in physical communication with side portions of display assembly 205 and base assembly 210.

FIG. 9 shows a stand assembly 900 which is similar to stand assembly 700 of FIG. 7. Stand assembly 900 includes a base 905, a stand 910, and a hook 915. Stand 910 includes a slide rail 920 and a magnet 925. Slide rail 920 includes channels 930, 935, and 940 that are formed and extend horizontally along slide rail 920. In this example, hook 915 is slid and inserted into channel 935, wherein stand 910 is at a middle height position, wherein stand assembly is in active mode. Further, the top portion of stand 910 may be at the same level as the top of base 705. FIG. 10 shows a side view of stand assembly 900.

FIG. 11 shows a stand assembly 1100 which is similar to stand assembly 900 of FIG. 8. Stand assembly 1100 includes a base 1105, a stand 1110, and a hook 1115. Stand 1110 includes a slide rail 1120 and a magnet 1125. Slide rail 1120 includes channels 1130, 1135, and 1140 that are formed and extend horizontally along slide rail 1120. In this example, hook 1115 is slid and inserted into channel 1140, wherein stand assembly 1100 is in inactive mode. Further, the top portion of stand 1110 may be near or the same level as the top of base 1105. FIG. 12 shows a side view of stand assembly 1100.

Figure 13:
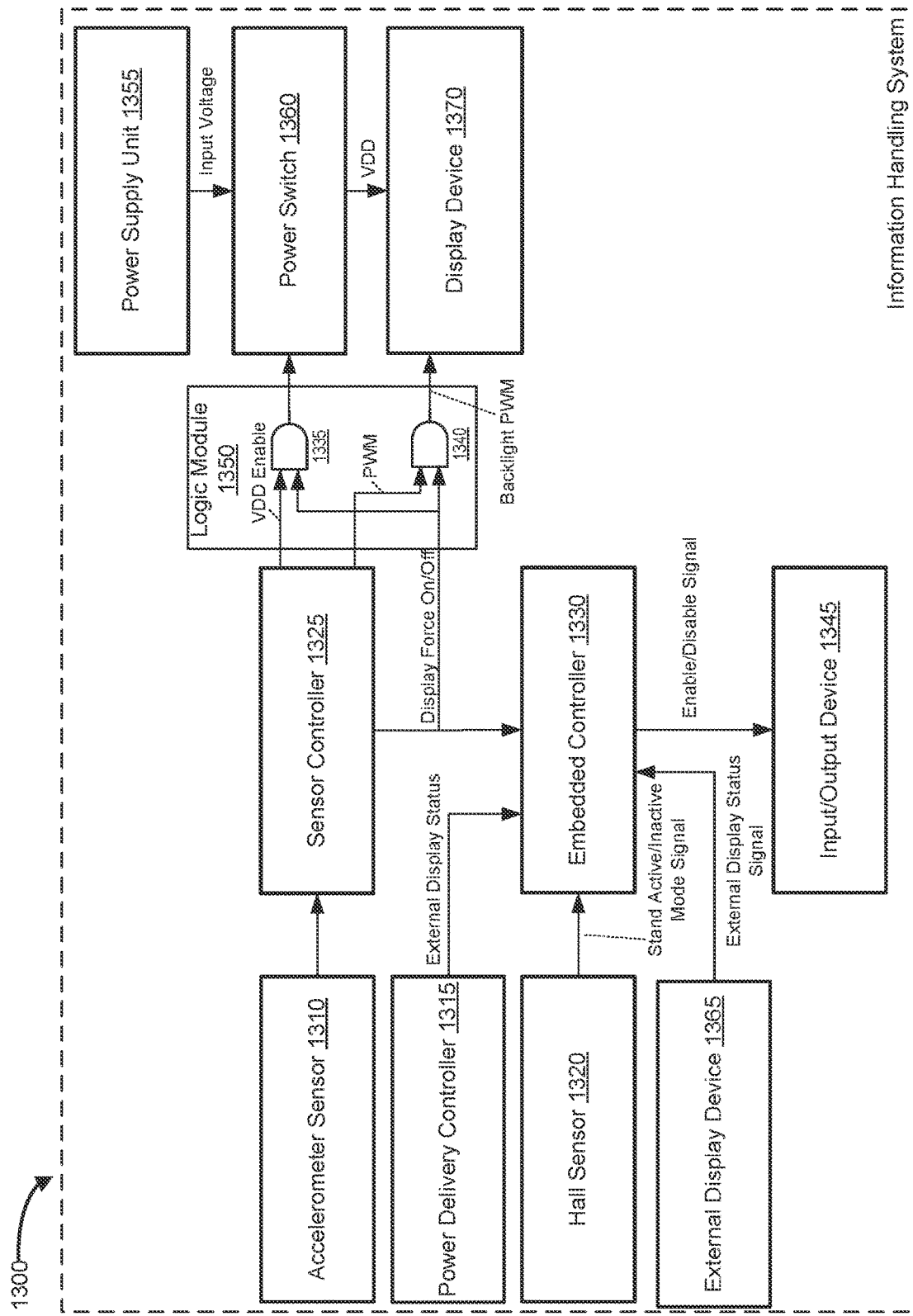
FIG. 13 is a block diagram of an information handling system configured for dynamic input/output support, according to an embodiment of the present disclosure.

FIG. 13 shows an information handling system 1300 with dynamic input/output support. Information handling system 1300, which is similar to information handling system 200 of FIG. 2, may be a portable, mobile, or of similar design with a convertible form factor. Information handling system 1300 includes an accelerometer sensor 1310, a power delivery controller 1315, a hall sensor 1320, a sensor controller 1325, an embedded controller 1330, an input/output device 1345, a logic module 1350, a power supply unit 1355, a power switch 1360, an external display device 1365, and a display device 1370. Logic module 1350 includes logic gates 1335 and 1340.

Accelerometer sensor 1310 is communicatively coupled to sensor controller 1325 which is communicatively coupled to embedded controller 1330. Power delivery controller 1315 and hall sensor 1320 are communicatively coupled to embedded controller 1330 which is communicatively coupled to input/output device 1345. Sensor controller 1325 is communicatively coupled to power switch 1360 and display device 1370 via logic module 1350. Power supply unit 1355 is coupled to display device 1370 via power switch 1360.

Accelerometer sensor 1310 may be communicatively coupled to sensor controller 1325. In particular, accelerometer sensor 1310 may be coupled with sensor controller 1325 via an interface such as an I²C, PCIe, or similar. In addition, sensor controller 1325, power delivery controller 1315, and hall sensor 1320 may be communicatively coupled to embedded controller 1330 which is communicatively coupled to input/output device 1345. Sensor controller 1325 may be communicatively coupled to power switch 1360 and display device 1370 via logic module 1350. Power supply unit 1355 may also be coupled to power switch 1360.

Display device 1370 may comprise any suitable system, device, or apparatus configured to display images, video content, and/or graphical user interfaces on a display screen of the display device and may include any type of light emitting diode (LED), organic LED, liquid crystal display (LCD), or other display technology. Regardless of the display technology used, display device 1370 includes a touch-sensitive input device that enables a user to provide input to information handling system 1300 through direct interaction with display device 1370.

Hall sensor 1320, a position detector, may be disposed of in a location in a display assembly or base assembly of information handling system 1300 such that hall sensor 1320 may detect the position of the stand. Hall sensor 1320 may be located in the base assembly proximate to a stand assembly. Accordingly, information handling system 1300 may include two or more hall sensors. Hall sensor 1320 may detect the current mode or a change in the mode of the stand assemblies based on the extension of its retractable stands. In particular, hall sensor 1320 may detect whether the stand assemblies are in an active or inactive mode based on the position of the extendable stands via an integrated magnet in each of the stands. The stand assembly may be in an inactive mode when its stand is not extended. Accordingly, the stand assembly may be in active mode when the stand is extended. For example, hall sensor 1320 may be a magnetic sensor that can be used for detecting the strength and direction of the magnetic field produced by the integrated magnet. Hall sensor 1320 may transmit a high voltage signal to embedded controller 1330 when the stand assembly is in the active mode and transmit a low voltage signal when the stand assembly is in the inactive mode.

Accelerometer sensor 1310 may be configured to detect a vertical axis based on the orientation of information handling system 1300, such as whether information handling system 1300 is in a 360-degree orientation, laptop orientation, tablet orientation, clamshell orientation, etc. For example, accelerometer sensor 1310 may detect whether the base assembly is facing up or whether the display assembly is facing down. Accelerometer sensor 1310 may transmit a signal to embedded controller 1330 via sensor controller 1325 to notify embedded controller 1330 of the current orientation or a change in the orientation of information handling system 1300. For example, accelerometer sensor 1310 may transmit a high voltage signal to sensor controller 1325 if information handling system 1300 is in a 360-degree orientation. Accordingly, accelerometer sensor 1310 may transmit a low voltage signal to sensor controller 1325 if information handling system 1300 is not the GPIO orientation.

Power delivery controller 1315 or a communication interface, such as a digital video interface, a high definition media interface, a universal serial bus, or similar that external display device 1365 is communicatively coupled to may provide an external display status signal to embedded controller 1330. For example, the external display status signal may be in a high state if an external display monitor is plugged in and connected to information handling system 1300. Accordingly, the external display status signal may be in a low state if the external display monitor is not connected to information handling system 1300. The external display device may include a monitor, a projector, or another type of display device. The external display status signal may be transmitted via a USB, such as a USB-C™, USB-power delivery, or similar. The external display status signal may further go through power delivery controller 1315. The external display status signal may also be transmitted via HDMI, display port, or similar. The external display status signal may further go through a GPIO. In another example, the external display status signal may be received from a dock sensor which would indicate the status of docking of information handling system 1300 to a docking station associated with the external display device.

Sensor controller 1325 may be configured to provide signals to embedded controller 1330 based on signals received from accelerometer sensor 1310. For example, sensor controller 1325 may provide a display force on/off signal to embedded controller 1330 which may determine the state of the enable/disable signal provided by embedded controller 1330 to input/output device 1345. In one embodiment, if information handling system 1300 is in a 360-degree orientation, then display device 1370 may be turned off while input/output device 1345 may be turned on. For example, the display force on/off signal may be a high voltage signal (off) when accelerometer sensor 1310 transmits a signal that information handling system 1300 is in the 360-degree orientation. Accordingly, the display force on/off signal may be a low voltage signal (on) when accelerometer sensor 1310 transmits a signal that information handling system 1300 is not in the 360-degree orientation.

Based on the display force on/off signal, external display status signal, and stand active/inactive mode signal, embedded controller 1330 may transmit a high voltage or a low voltage enable/disable signal. In one embodiment, enable/disable signal may be used to enable or disable input/output device 1345. For example, if the display force on/off signal, external display status, and stand active mode signal are all high voltage signals, then enable/disable signal may be high which disables input/output device 1345. If one of the display force on/off signal, external display status, and stand active mode signal is a low voltage signal, then enable/disable signal may be low which enables input/output device 1345.

Sensor controller 1325 may be configured to provide signals to logic module 1350 based on the input signal from accelerometer sensor 1310. The signals provided to logic module 1350 may be used to determine whether to power on display device 1370 and adjust its backlight. Logic gate 1335 and logic gate 1340 may be AND gates. If both drain input voltage (VDD) enable signal and display force on/off signal are high voltage signals, then the output of logic gate 1335 is a high voltage signal. If one of the VDD enable signal and display force on/off signal is a low voltage signal, then the output of logic gate 1335 is a low voltage signal. In particular, display force on/off signal may be used to mask the VDD enable signal. If both the display force on/off signal and the VDD enable signal are high, then the output of logic gate 1335 may follow the signal of the VDD enable signal. If the display force on/off signal is low, then the output of logic gate 1335 may be a low voltage signal. Thus, the power to display device may be turned off.

Similarly, if both pulse width modulation (PWM) signal and display force on/off signals are high voltage signals, then the output of logic gate 1340 is a high voltage signal. If one of the PWM signal and display force on/off signal is a low voltage signal, then the output of logic gate 1340 is a low voltage signal. In particular, display force on/off may be used to mask the PWM signal. If both the display force on/off signal and the PWM signal are high, then the output of logic gate 1340 may follow the high/low duty cycle of the PWM signal. If display force on/off signal is a low voltage signal, then the output of logic gate 1340 may be a low voltage signal. Thus, the backlight may be dimmed or turned off.

The output of logic gate 1335 may be used to determine whether to power on display device 1370. For example, if the output of logic gate 1335 is a high voltage signal, then power switch 1360 connects power supply unit 1355 to display device 1370 allowing input voltage as input. If power supply unit 1355 is connected to display device 1370, then the VDD signal is a high voltage signal and display device 1370 is enabled or powered on. Otherwise, if power supply unit 1355 is disconnected from display device 1370 then the VDD signal is a low voltage signal and display device 1370 is disabled or powered off. The output of logic gate 1340 may be used to determine whether to dim the backlight associated with display device 1370.

In particular, sensor controller 1325 may provide a VDD enable signal and display force on/off signal at logic gate 1335. The display force on/off signal may be a low voltage signal when the information handling system is in the 360-degree orientation and a high voltage signal otherwise. When both display force on/off signal and VDD enable signal are high voltage signals, then logic gate 1335 may transmit a high voltage signal to power switch 1360. Sensor controller 1325 may also provide a PWM signal and display force on/off signal to logic gate 1340. If both the PWM signal and display force on/off signal are high voltage signals, then the brightness level of the backlight follows the PWM signal. The PWM signal is a duty cycle signal, accordingly adjusting the brightness level of the backlight may be performed by adjusting the percentage of the timing of the duty cycle. If one of the PWM signal and display force on/off signal is a low voltage signal, then the backlight PWM signal is a low voltage signal.

Power switch 1360 may couple an input voltage from power supply unit 1355 along with the output of logic gate 1335. Power supply unit 1355 can generate a plurality of direct current and alternating current voltages. The input voltage may be an always-on voltage (ALW), such as a 3VALW or 5VALW, regardless of the advanced configuration and power interface states that information handling system 1300 is operating. Power switch 1360 may be configured to selectively connect and disconnect power supply unit 1355 to display device 1370 based on the output of logic gate 1335. If power switch 1360 disconnects power supply unit 1355, then VDD is not applied to display device 1370, turning display device 1370 on. If power switch 1360 connects power supply unit 1355 to display device 1370, then VDD is applied to display device 1370, turning display device 1370 off. VDD may be 3.3 volts or 5 volts. VDD may also be used to turn up the brightness level on display device 1370. The LCD VDD along with backlight PWM may be used to adjust the backlight and brightness of display device 1370.

Embedded controller 1330 may be configured to execute or manage interactions with various sensors for detection of orientation, status relative to an external display device, modes, or other inputs. Embedded controller 1330 may further provide data or access to data that indicates the orientation of information handling system 1300, whether the stand assemblies are active or not, status relative to an external display device, etc. Embedded controller 1330 may be configured to enable or disable input/output device 1345 based on inputs from sensor controller 1325, power delivery controller 1315, and hall sensor 1320. Embedded controller 1330 may interface with sensor controller 1325, power delivery controller 1315, and input/output device 1345 through general-purpose input/output (GPIO) pins. In other instances, embedded controller 1330 may interface with other devices such as hall sensor 130 via other interfaces, such as I²C and SPI communication links.

In one embodiment, if information handling system 1300 is in the 360-degree orientation, the external display device is connected to information handling system 1300, and its stand assemblies are in active mode, then embedded controller 1330 may send a signal to enable input/output device

1345. Input/output device 1345 may include a keyboard, a touch input device, an audio output device, an audio input device, a fingerprint reader, or similar. Otherwise, embedded controller 1330 may send a signal to disable input/output device 1345 based on other conditions, such as when information handling system 1300 is in a clamshell mode.

Although it is shown that embedded controller 1330 sends the enable/disable signal to one input/output device, embedded controller 1330 may send the enable/disable signal to a plurality of input/output devices. Further, embedded controller 1330 may send an enable signal to one input/output device while sending a disable signal to another input/output device. Embedded controller 1330 may be configured to enable or disable one or more input/output components, such as a keyboard or touchpad, of the portable information handling system based on the input received from the hall sensor and the GPIO. Accordingly, the user may be able to use the enabled input/output device when information handling system 1300 is in a 360-degree orientation with extended stands and an external display device is connected to the information handling system. For example, the user may use the keyboard of information handling system 1300 instead of connecting an external peripheral keyboard.

In various embodiments, information handling system 1300 may not include each of the components shown in FIG. 13. Each of these components can be implemented with hardware and/or software, including virtual machines. Additionally, or alternatively, information handling system 1300 may include various additional components in addition to those that are shown in FIG. 13. For example, there may be multiple instances of each sensor type shown. As such, there may be two or more hall sensors, accelerometer sensors, sensor controllers, etc. Furthermore, some components that are represented as separate components may in certain embodiments instead are integrated with other components. For example, in certain embodiments, all or a portion of the functionality provided by the illustrated components may instead be provided by components integrated into one or more processor(s) as a system-on-a-chip. Accordingly, in one embodiment, sensor controller 1325 may be implemented as a system-on-a-chip.

Those of ordinary skill in the art will appreciate that the configuration, hardware, and/or software components of the information handling system may vary. For example, the illustrative components within the information handling system are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description.

Figure 14:
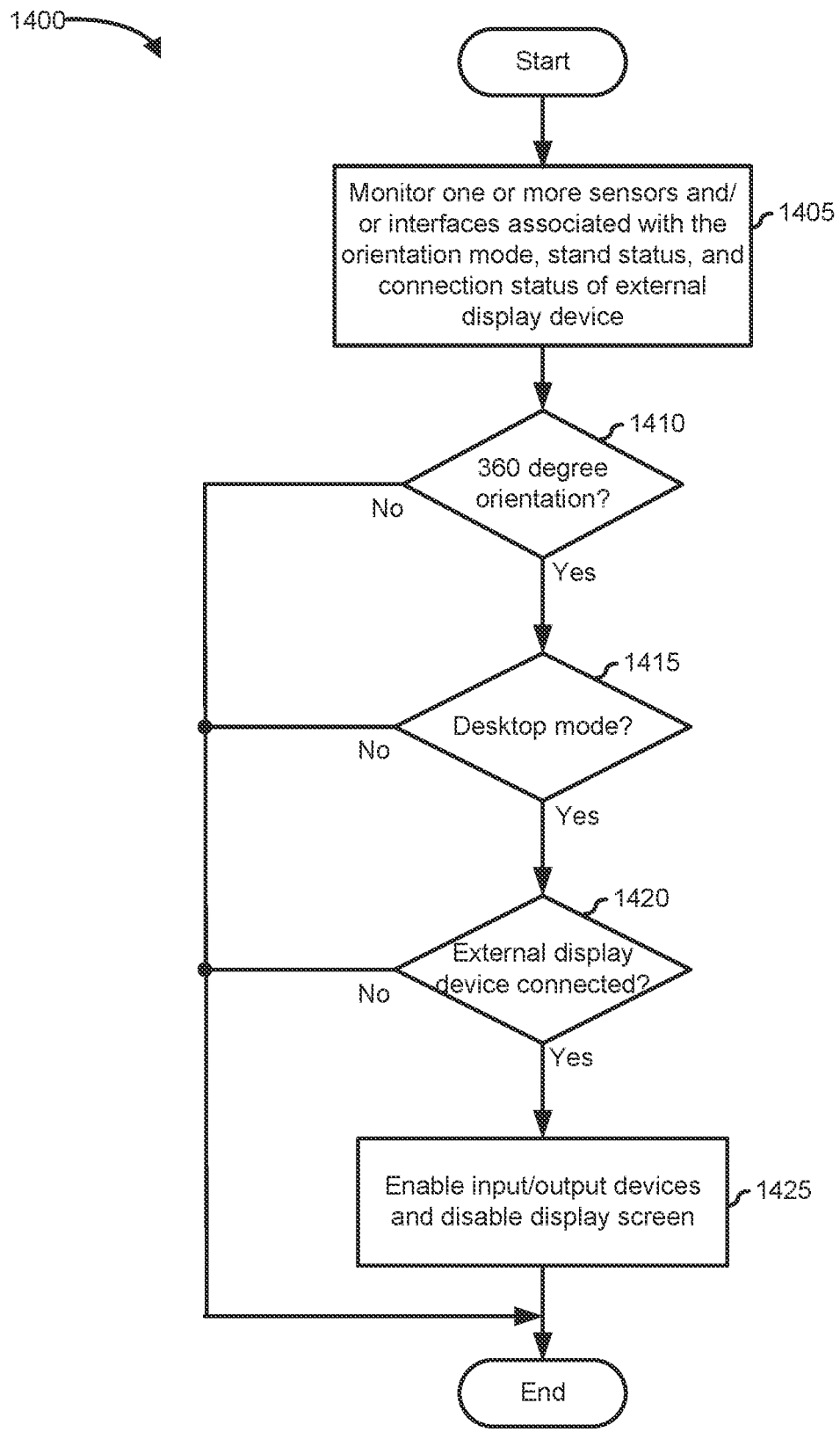
FIG. 14 is a flowchart illustrating a method for dynamic input/output support for an information handling system, according to an embodiment of the present disclosure.

FIG. 14 shows a flowchart of method 1400 for dynamic input/output support for portable information handling systems. Method 1400 may be performed by one or more components of information handling system 1300 of FIG. 13. However, while embodiments of the present disclosure are described in terms of information handling system 1300 of FIG. 13, it should be recognized that other systems may be utilized to perform the described method. One of skill in the art will appreciate that this flowchart explains a typical example, which can be extended to advanced applications or services in practice.

Method 1400 typically starts at block 1405 where the method may monitor one or more sensors and/or interfaces associated with determining the orientation, mode, and connection status of an external display device to the information handling system. At decision block 1410, the method may determine whether the information handling system is in a 360-degree orientation. The information handling system may have a form factor that allows it to be in a 360-degree orientation, wherein the lid assembly is rotated or flipped 360 degrees relative to the base assembly. The lid assembly may have been spun 180 degrees before it was folded down. In particular, an embedded controller may detect an input signal from an accelerometer sensor via a GPIO pin that indicates whether the information handling system is in the 360-degree orientation. If the information handling system is in the 360-degree orientation, then the "YES" branch is taken, and the method proceeds to decision block 1415. If the information handling system is not in the 360-degree orientation, then the method ends.

At decision block 1415, the method determines whether the information handling system is in desktop mode. The information handling system may be in desktop mode if at least one of its stand assemblies is in active mode. If the information handling system is in desktop mode, then the "YES" branch is taken, and the method proceeds to decision block 1420. If the information handling system is not in desktop mode, then the method ends.

At decision block 1420, the method determines whether an external display device is connected to the information handling system. In one embodiment, the embedded controller may receive a high voltage input signal from a power delivery controller, a docking station, a USB hub, or an interface, such as an HDMI, USB-C™ or similar connector when an external display device is connected. If the external display device is connected to the information handling system, then the "YES" branch is taken, and the method proceeds to block 1425. If the external display device is not connected to the information handling system, then the method ends.

At block 1425, the method may enable one or more input/output devices associated with the information handling system, such as its keyboard, touch input pad, etc. to retain their functionality. In addition, the method may disable the display device of the information handling system. For example, the method may disable the backlight and LCD lights of the display device Although FIG. 14 show example blocks of method 1400 in some implementation, method 1400 may include additional blocks, fewer blocks, different blocks, or differently arranged blocks than those depicted in FIG. 14. Those skilled in the art will understand that the principles presented herein may be implemented in any suitably arranged processing system. Additionally, or alternatively, two or more of the blocks of method 1400 may be performed in parallel. For example, decision block 1410 and decision block 1415 may be performed in parallel.

As used herein, a hyphenated form of a reference numeral refers to a specific instance of an element and the un-hyphenated form of the reference numeral refers to the collective or generic element. Thus, for example, stand assemblies "410-1" refers to an instance of a stand assembly class, which may be referred to collectively as stand assemblies "410" and any one of which may be referred to generically as a stand assembly "410."

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   detecting, by a processor, whether an information handling system is in a 360-degree orientation, wherein the information handling system includes a base and a display;
   detecting whether the information handling system is in a desktop mode, wherein the desktop mode is triggered when a stand of the information handling system is extended, wherein the stand is configured to rotationally couple the base and the display, and wherein the stand is configurable into variable positions to adjust height of the base from a surface;
   detecting whether an external display device is connected to the information handling system; and
   in response to determining that the information handling system is in the 360-degree orientation, that the information handling system is in the desktop mode, and that the external display device is connected to the information handling system, enabling an input/output device of the information handling system and disabling a display device.

2. The method of claim 1, wherein the information handling system is in an inactive mode when the stand of the information handling system is not extended.

3. The method of claim 2, wherein the stand is attached to a hinge of the information handling system.

4. The method of claim 2, wherein the stand can be extended into variable positions via a slide rail.

5. The method of claim 2, wherein the stand includes a magnet.

6. The method of claim 2, wherein a sensor is used to detect whether the stand is extended and transmit a signal to the information handling system.

7. The method of claim 1, wherein the disabling of the display device includes disconnecting the display device from a power supply unit.

8. The method of claim 1, further comprising dynamically adjusting a backlight pulse width modulation.

9. The method of claim 1, wherein the input/output device is a keyboard.

10. The method of claim 1, wherein the input/output device is a touchpad.

11. An information handling system, comprising:
    a stand coupled to the information handling system via a base, wherein an extension of the stand triggers a desktop mode of the information handling system during the extension of the stand, wherein the stand is configured to rotationally couple the base and a display, and wherein the stand is configurable into variable positions to adjust height of the base from a surface; and
    a memory storing instructions that when executed cause a processor of the information handling system to perform operations including:
    detecting whether the information handling system is in a 360-degree orientation;
    detecting whether the information handling system is in the desktop mode;
    detecting whether an external display device is connected to the information handling system; and
    in response to determining that the information handling system is in the 360-degree orientation, that the information handling system is in the desktop mode, and that the external display device is connected to the information handling system, enabling an input/output device of the information handling system and disabling a display device of the information handling system.

12. The information handling system of claim 11, wherein the information handling system is in an inactive mode when the stand of the information handling system is not extended.

13. The information handling system of claim 11, wherein the base is a hinge of the information handling system.

14. The information handling system of claim 11, wherein the stand can be extended into variable positions via a slide rail.

15. The information handling system of claim 11, wherein the disabling of the display device includes disconnecting the display device from a power supply unit.

16. A non-transitory computer-readable media to store instructions that are executable to perform operations comprising:
- detecting whether an information handling system is in a 360-degree orientation wherein the information handling system includes a base and a display;
- detecting whether the information handling system is in a desktop mode, wherein the desktop mode is triggered by a signal from a sensor when a stand of the information handling system is extended, wherein the stand is configured to rotationally couple the base and the display, and wherein the stand is configurable into variable positions to adjust height of the base from a surface;
- detecting whether an external display device is connected to the information handling system; and
- in response to determining that the information handling system is in the 360-degree orientation, that the information handling system is in the desktop mode, and that the external display device is connected to the information handling system, enabling an input/output device of the information handling system and disabling a display device of the information handling system.

17. The non-transitory computer-readable media of claim 16, wherein the stand of the information handling system is in an inactive mode when the stand of the information handling system is not extended.

18. The non-transitory computer-readable media of claim 17, wherein the stand is attached to a hinge of the information handling system.

19. The non-transitory computer-readable media of claim 17, wherein the stand can be extended into variable positions via a slide rail.

20. The non-transitory computer-readable media of claim 16, wherein the disabling of the display device includes disconnecting the display device from a power supply unit.

* * * * *